United States Patent Office 2,907,207
Patented Oct. 6, 1959

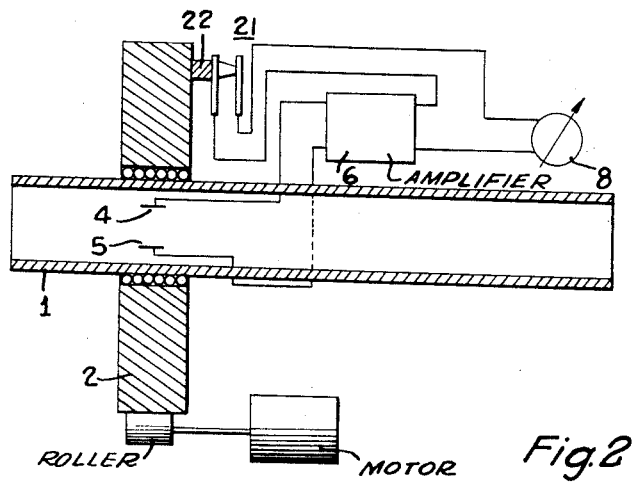
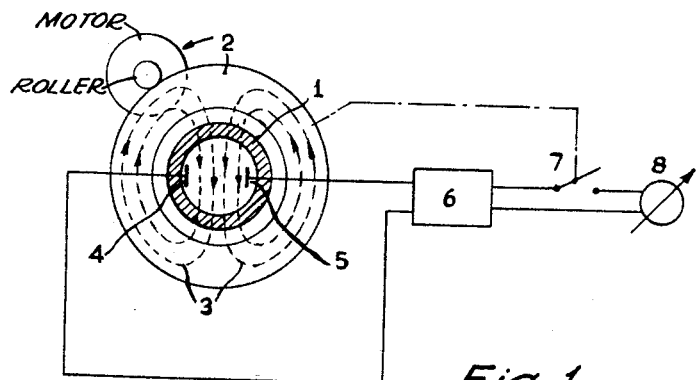

2,907,207

DEVICE FOR MEASURING THE FLOW SPEED OF A LIQUID

Herre Rinia, Eindhoven, Netherlands, assignor, by mesne assignments, to North American Philips Company, Inc., New York, N.Y., a corporation of Delaware Application June 8, 1956, Serial No. 590,142

Claims priority, application Netherlands June 13, 1955

4 Claims. (Cl. 73—194)

The present invention relates to a device for measuring liquid flow speed.

It is known to measure by electrical means the speed of flow of electrically conductive or semiconductive liquids in a line by utilizing the phenomenon that in an electric lead moving in a magnetic field, an electromotive force is induced, the value of which is proportional to the speed of movement of the conductor.

In known devices based on this principle, the liquid flows through a line placed in a homogeneous magnetic field, so that its axis is at right angles to the lines of force of the field. Arranged diametrically in opposition in the wall of the line are two electrodes, the connecting line of which is substantially at right angles to the lines of force. Due to the flow of the liquid, a voltage is induced between said electrodes, which is substantially proportional to the speed of flow of the liquid and which is measured.

In order to avoid the influence of polarization of the electrodes, it is also known to utilize an alternating magnetic field instead of a constant magnetic field. In this case it is necessary to take particular steps for compensating the electromotive force induced in the measuring circuit by the usual means of a transformer, in which an electromotive force is induced in the measuring circuit by the alternating field, even if the liquid does not flow. However, it is an advantage that the voltage produced as a result of the liquid flow is an alternating voltage, which may be amplified in a simpler way than a direct voltage. The amplified voltage, after being rectified, is measured by means of a direct-current instrument. In prior devices, the alternating magnetic field is usually produced in a laminated magnetic circuit comprising an energizing coil, traversed by an alternating current which may be taken from the power supply source.

The present invention relates to such devices for measuring liquid flows, comprising a line traversed by the liquid, means for producing a magnetic field varying preferably homogeneously at right angles to the axis of the line, and also means for measuring the electromotive force produced in the magnetic field between two electrodes provided in the line as a result of the movement of the liquid. The usual laminated magnetic circuit including the energizing coil may be dispensed with, according to the invention, wherein the magnetic field is an alternating or rotational field produced by a rotary permanent magnet.

The magnet may be a permanently magnetized ferromagnetic compound having a high coercive force, which is known as such and which is electrically substantially non-conductive. This has the advantage that the magnetic field may have a pre-determined constant strength and that by particular shaping of the magnet and suitable choice of its magnetization, the field may readily be made properly homogeneous, at least at its intersection with the liquid line.

The alternating voltage induced in the magnetic field between the electrodes as a result of the movement of the liquid is independent, as far as its amplitude is concerned, of the rotational speed of the magnet. This alternating voltage may be amplified in the usual manner in an alternating voltage amplifier, the amplified voltage being rectified and measured.

According to the invention, the device may be simplified in many cases by rectifying the amplified measured voltage by means of a rectifier which is mechanically coupled with the magnet, such as, for example, a switch type rectifier. This may be a rotary rectifier. Since the measured voltage and the voltage induced in the measuring circuit by means of a transformer are shifted by 90° with respect to one another, the voltage induced by the transformer, which is evident in prior art devices, may thus readily be eliminated.

In order that the invention may be readily carried into effect, it will now be described, by way of example, with reference to the accompanying drawing, wherein:

Fig. 1 is a schematic diagram of an embodiment of the device of the present invention; and Fig. 2 is another view, partly in section, of the device of Fig. 1.

The liquid, of which the speed of flow is to be measured, flows through a line 1 having a circular cross-section. By means of a permanent magnet 2, which may be constituted by a sintered metal compound which is electrically substantially non-conductive, it is possible to produce a bipolar magnetic rotational field at the area, at which the speed of flow is measured. For this purpose, the magnet is given an annular shape and is magnetized so as to obtain two poles located diametrically in opposition on the inner periphery. The course or path of the lines of force is indicated by dotted lines 3. Two electrodes 4 and 5 provided diametrically in opposition in the line close to its inner periphery are connected to an amplifier 6. The magnet is given a rotational movement about its axis by means of a driving device which may be a motor adapted to rotate said magnet through a roller, for example.

If a rotary rectifier is used for rectifying the amplified measured voltage, it may be coupled directly with the magnet, as shown in Fig. 2, and be constituted by a contact which is closed at the moment at which the measured voltage reaches its maximum value. The electromotive force induced by means of a transformer is thus eliminated. The direct-current meter is indicated by 8. The circuit between the amplifier 6 and the meter 8 may include a switch 21 having contacts which are normally open thereby maintaining an open circuit between said amplifier and said meter. A protruding member 22 on the magnet 2 may be adapted to close the contacts of the switch 21 once per revolution of said magnet during the production of a maximum voltage thereby functioning as a rotary rectifier to rectify the amplified voltage applied to the measuring means 8. In Fig. 2, it is presumed that for the closed contact positions shown the magnetic field lines are substantially perpendicular to the plane of the drawing.

While the invention has been described by means of a specific example and in a specific embodiment, I do not wish to be limited thereto, for obvious modifications will occur to those skilled in the art without departing from the spirit and scope of the invention.

What is claimed is:

1. A device for measuring the flow speed of a liquid flowing through a liquid conducting line, comprising a permanent magnet positioned outside said line in substantially close proximity thereto with said line disposed between two opposing poles of said magnet thereby to produce a field in said liquid in a transverse direction, means for rotating said magnet about said line thereby to produce a rotating magnetic field through said liquid, and means for measuring the electromotive force produced by the flow of said liquid in said magnetic field comprising a pair of diametrically opposed spaced electrodes positioned in said liquid within said line and means for measuring the voltage across said electrodes.

2. A device for measuring the flow speed of a liquid flowing through a liquid conducting line, comprising a rotative permanent magnet coaxially positioned outside said line in substantially close proximity thereto with said line disposed between two opposing poles of said magnet thereby to produce a field in said liquid in a transverse direction, means for axially rotating said magnet thereby producing a rotating magnetic field through said liquid, and means for measuring the electromotive force produced by the flow of said liquid in said magnetic field comprising a pair of diametrically opposed spaced electrodes positioned in said liquid within said line, means for rectifying the voltage across said electrodes and means for measuring said voltage across said electrodes.

3. A device for measuring the flow speed of a liquid flowing through a liquid conducting line, comprising a rotative permanent magnet coaxially positioned outside said line in substantially close proximity thereto with said line disposed between two opposing poles of said magnet thereby to produce a field in said liquid in a transverse direction, means for axially rotating said magnet thereby producing a rotating magnetic field through said liquid, and means for measuring the electromotive force produced by the flow of said liquid in said magnetic field comprising a pair of diametrically opposed spaced electrodes positioned in said liquid within said line, a rectifier arrangement affixed to and rotating with said magnet, means for applying the voltage across said electrodes to selected input points on said rectifier arrangement and means for measuring the voltage across selected output points on said rectifier arrangement.

4. A device for measuring the flow speed of a liquid flowing through a liquid conducting line, comprising a rotative permanent magnet coaxially positioned outside said line in substantially close proximity thereto with said line disposed between two opposing poles of said magnet thereby to produce a field in said liquid in a transverse direction, means for axially rotating said magnet thereby producing a rotating magnetic field through said liquid, a rectifier arrangement affixed to and rotating with said magnet, a pair of diametrically opposed spaced electrodes positioned in said liquid within said line, means for amplifying the voltage across said electrodes, means for applying the output of said amplifying means to selected input points in said rectifier arrangement and voltage indicating means coupled to selected output points on said rectifier arrangement.

References Cited in the file of this patent

UNITED STATES PATENTS

| | | |
|---|---|---|
| 1,907,343 | Carpenter | May 2, 1935 |
| 2,255,477 | Tognola | Sept. 9, 1941 |
| 2,651,733 | Stark | Sept. 8, 1953 |
| 2,729,103 | Raynsford et al. | Jan. 3, 1956 |